United States Patent [19]
Erhardt

[11] Patent Number: 5,876,534
[45] Date of Patent: Mar. 2, 1999

[54] COMPOSITE PANELS AND PROCESS FOR MANUFACTURING THEM

[75] Inventor: Günter Erhardt, Trausdorf, Austria

[73] Assignee: Isosport Verbundbauteile Gesellschaft M.B.H., Austria

[21] Appl. No.: 849,124

[22] PCT Filed: Oct. 4, 1996

[86] PCT No.: PCT/AT96/00186

§ 371 Date: Jun. 4, 1997

§ 102(e) Date: Jun. 4, 1997

[87] PCT Pub. No.: WO97/12756

PCT Pub. Date: Apr. 10, 1997

[30] Foreign Application Priority Data

Oct. 4, 1995 [AT] Austria ................................. 1643/95

[51] Int. Cl.⁶ ........................ B29C 47/06; B29C 47/90; B32B 31/06; B32B 31/08
[52] U.S. Cl. ............... 156/78; 156/244.22; 156/244.24; 156/244.27; 156/324; 264/45.9; 264/258; 264/321
[58] Field of Search ............... 156/243, 244.2, 156/244.24, 244.27, 309.9, 310, 322, 555, 583.5, 78, 79, 324; 264/46.1, 46.3, 211.12, 237, 257, 258, 284, 45.9, 321; 428/318.6, 319.7, 319.9; 442/367, 373, 374

[56] References Cited

U.S. PATENT DOCUMENTS

| | | | |
|---|---|---|---|
| 3,235,437 | 2/1966 | Varlet | 156/551 |
| 3,619,316 | 11/1971 | Ishida et al. | 156/77 |
| 3,765,998 | 10/1973 | Oswald et al. | 161/170 |
| 3,915,772 | 10/1975 | Weissenfels et al. | 156/79 |
| 4,086,316 | 4/1978 | Ahrweiler et al. | 264/120 |
| 4,302,269 | 11/1981 | Steinberg et al. | 156/243 |
| 4,596,736 | 6/1986 | Eichhorn et al. | 428/215 |
| 4,622,192 | 11/1986 | Ma | 264/136 |
| 4,844,766 | 7/1989 | Held | 156/309.9 |
| 5,141,583 | 8/1992 | Held | 156/324 |
| 5,330,595 | 7/1994 | Held | 156/64 |
| 5,565,056 | 10/1996 | Lause et al. | 156/243 |
| 5,716,479 | 2/1998 | Mikats et al. | 156/244.27 |

FOREIGN PATENT DOCUMENTS

| | | |
|---|---|---|
| 0 313 171 | 4/1989 | European Pat. Off. . |
| 0 322 774 | 7/1989 | European Pat. Off. . |
| 0 363 794 | 4/1990 | European Pat. Off. . |
| 0 383 199 | 8/1990 | European Pat. Off. . |
| 0 393 476 | 10/1990 | European Pat. Off. . |
| 0 605 235 | 7/1994 | European Pat. Off. . |
| 0 636 463 | 2/1995 | European Pat. Off. . |
| 0 657 281 | 6/1995 | European Pat. Off. . |
| 25 45 700 | 4/1977 | Germany . |
| 2545700 | 4/1977 | Germany . |
| 36 44 676 | 7/1988 | Germany . |
| 43 23 590 | 3/1994 | Germany . |
| 58-003832 | 1/1983 | Japan . |
| 1426077 | 2/1976 | United Kingdom . |

*Primary Examiner*—Blaine R. Copenheaver
*Attorney, Agent, or Firm*—Bacon & Thomas, PLLC

[57] ABSTRACT

The invention pertains to a composite panel comprising a foamed thermoplastic core layer which is joined on both sides without adhesive to thermoplastic outer layers reinforced by fiberglass mats. The composite panel is used to make molded parts for motor vehicles.

9 Claims, 4 Drawing Sheets

COMPOSITE PANELS AND PROCESS FOR MANUFACTURING THEM

BACKGROUND OF THE INVENTION

The invention concerns a composite panel as well as a process for the manufacture of the same.

DESCRIPTION OF RELATED ART

Composite panels are multi-layered connecting materials made up by one or more core layers as well as by outer layers attached to the same. They are used, for example, for the molded fittings of motor vehicles, causing the composite panel to be subjected to high mechanical stress. Therefore, the raw material providing for at least the outer layers has a metallic base. However, these materials are unsuitable, particularly due to their weight, for automobile fittings.

Therefore, the composite panels used for the molded fittings of automobiles have preferably a base of light plywood. These plywood composite panels consist of a fundamentally uneven number—at least 3 to 15—of thin wood layers glued to each other, wherein the fiber direction of the adjoining layers is alternated mainly at 90°. The adhesion is carried out with acrylic adhesives under pressure and high temperatures, generating work materials of a higher resistance.

These materials are, however, disadvantaged because they are structured inhomogeneously with respect to the material due to the adhesive layers. Defective areas with deteriorated mechanical values can also be caused by the inhomogeneously structured composite construction.

Plywood also has the further disadvantage that it absorbs in large measure the humidity of the air, whereby the mechanic values such as those of the resistance to bending are also deteriorated.

The object of the invention is to provide homogeneously structured composite panels that have good mechanical values and low total weight.

SUMMARY OF THE INVENTION

Proposed is a composite panel (40) comprising a foamed thermoplastic core layer (39), which is attached on both sides with fiberglass mat-reinforced outer layers (25, 25') without adhesive.

This composite panel is further characterized in that it has a density of 0.5 to 0.8 g/cm$^3$ and in that the thermoplastic materials of the core and the outer layers are of the same group of plastics, preferably of the group of the polyolefins.

Further advantages of the composite panel of the invention are that the thermoplastic polyoleofin material of the core and the outer layers is polypropylene.

A process for manufacturing a composite panel is also included in the invention, which is characterized in that 1) for the formation of outer layers (25, 25') in the form of fiberglass mat-reinforced thermoplastics, two fiberglass mats (10, 11) are guided through the nozzle apertures (3', 4') of the impregnation nozzles (3, 4), which are feed in controlled manner by means of the extruders (1, 2) with the thermoplastic melts (26, 28) and in that each of the two streams of melt (26', 26", and 28', 28") is formed and applied to the upper and lower side of the glass mats (10, 11) at the outlet of the nozzle aperture (27, 27'), whereby the pre-impregnation of the fiberglass mats takes place and in that 2) these glass mats (30, 30') pre-impregnated with thermoplastic, together with the foamed thermoplastic (39') transported by means of the extruder nozzle aperture (37), which thermoplastic (39') serves for the formation of the core layer (39), are guided into the gap (18) between rollers of the double band press (5), whereby the pre-impregnated fiberglass mats are pre-calibrated, on the one hand, and on the other, are attached on both sides to the foamed thermoplastics (39') without using an adhesive, so that a pre-compound (36) is formed and then pressed under pressure by means of the cooling plates (22, 22') into the composite panel (40).

The fiberglass mats (10, 11) are advantageously preheated in the nozzle aperture (3', 4') and the foamed thermoplastic (39') is preheated in the nozzle aperture (37).

Further advantages of the invention process are that a low viscosity polypropylene melt is used as thermoplastic melt (26, 28), which can contain additives such as peroxide, and the melt stream (26', 26") and (28', 28") can be regulated by means of the melt-control valves (29, 29') installed in the distributor unit (8, 9).

A further advantage of the invention process, the fiberglass mat is comprised of cut, tangled and/or unidirectionally, and/or directionally cut glass fibers with a surface content of 450 to 1300 g/m$^2$.

It is also proposed in the invention that the pre-impregnated fiberglass mats (30, 30') can be pre-calibrated in the cross-sectional adjustable gap (18).

Further advantages of the process of the invention are that the pre-compound (36) of the composite panel (40) is compressed in the pressure range up to 2 bars and the foamed thermoplastic (39') transported through the extruder nozzle aperture (37) is comprised of polypropylene.

The composite panel manufactured according to the invention is used for manufacturing components for the molded parts of motor vehicles.

BRIEF DESCRIPTION OF THE FIGURES OF DRAWING

The invention will be further described with respect to FIGS. 1 to 4.

DETAILED DESCRIPTION OF THE PREFERRED EMBODIMENT

Figure 1:
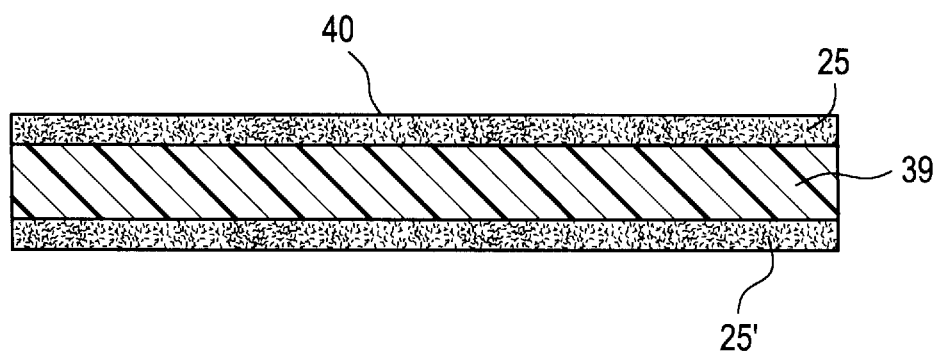
FIG. 1 shows the composite panel (40) of the invention with the thermoplastic outer layers (25, 25') which are reinforced with the glass mat on both sides of the thermoplastic foamed core (39).
Figure 2:
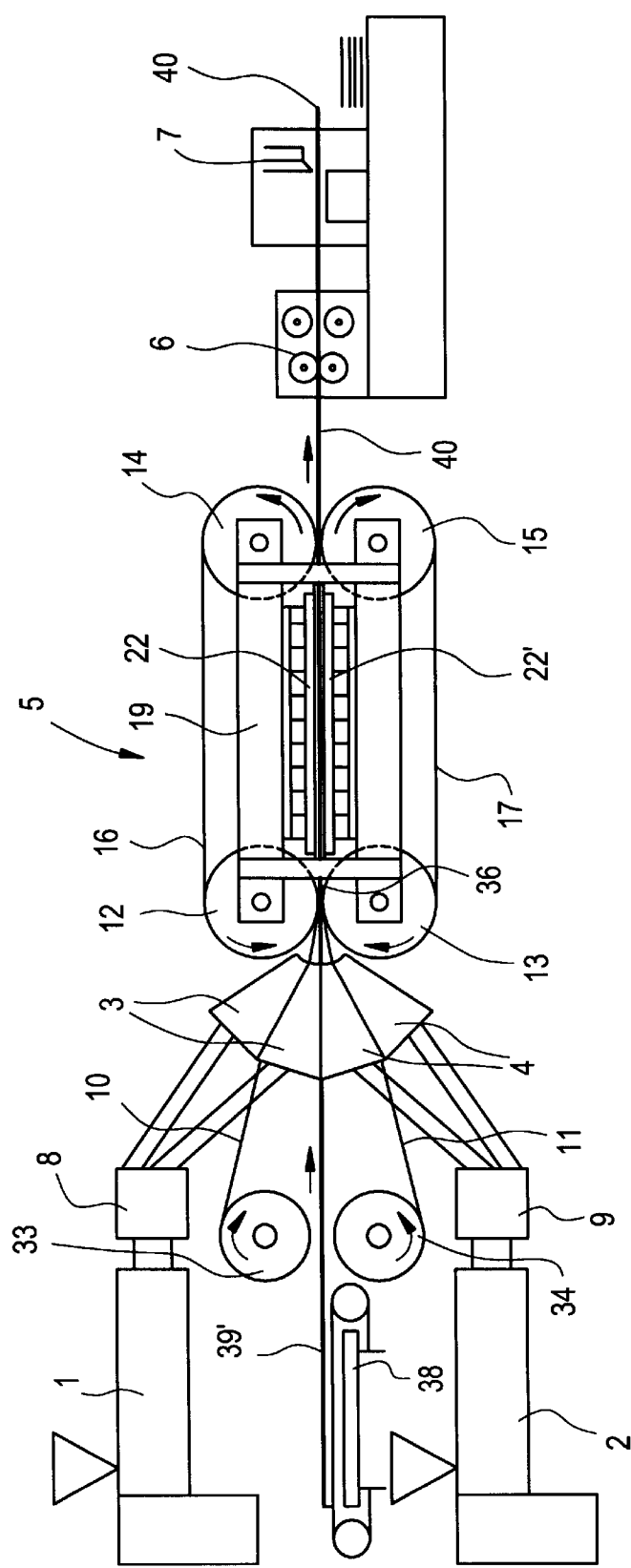
FIG. 2 shows basically the extruders (1, 2), the impregnation nozzles (3, 4), and the double band presses (5).
Figure 3:
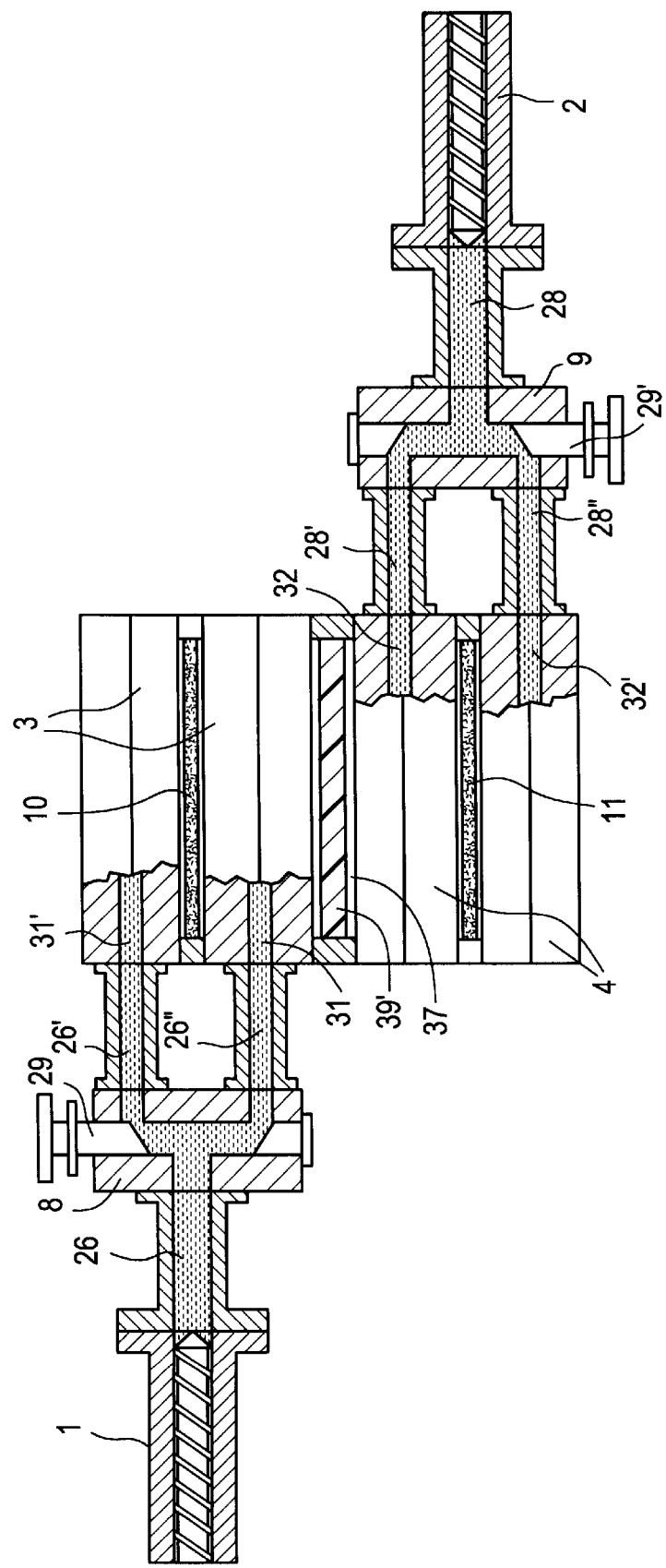
FIG. 3 shows the detail of FIG. 1 concerning the extruder units (1) and (2), the distributer units (8) and (9) with the melt-control valves (29, 29'), as well as the impregnation nozzles (3, 4).
Figure 4:
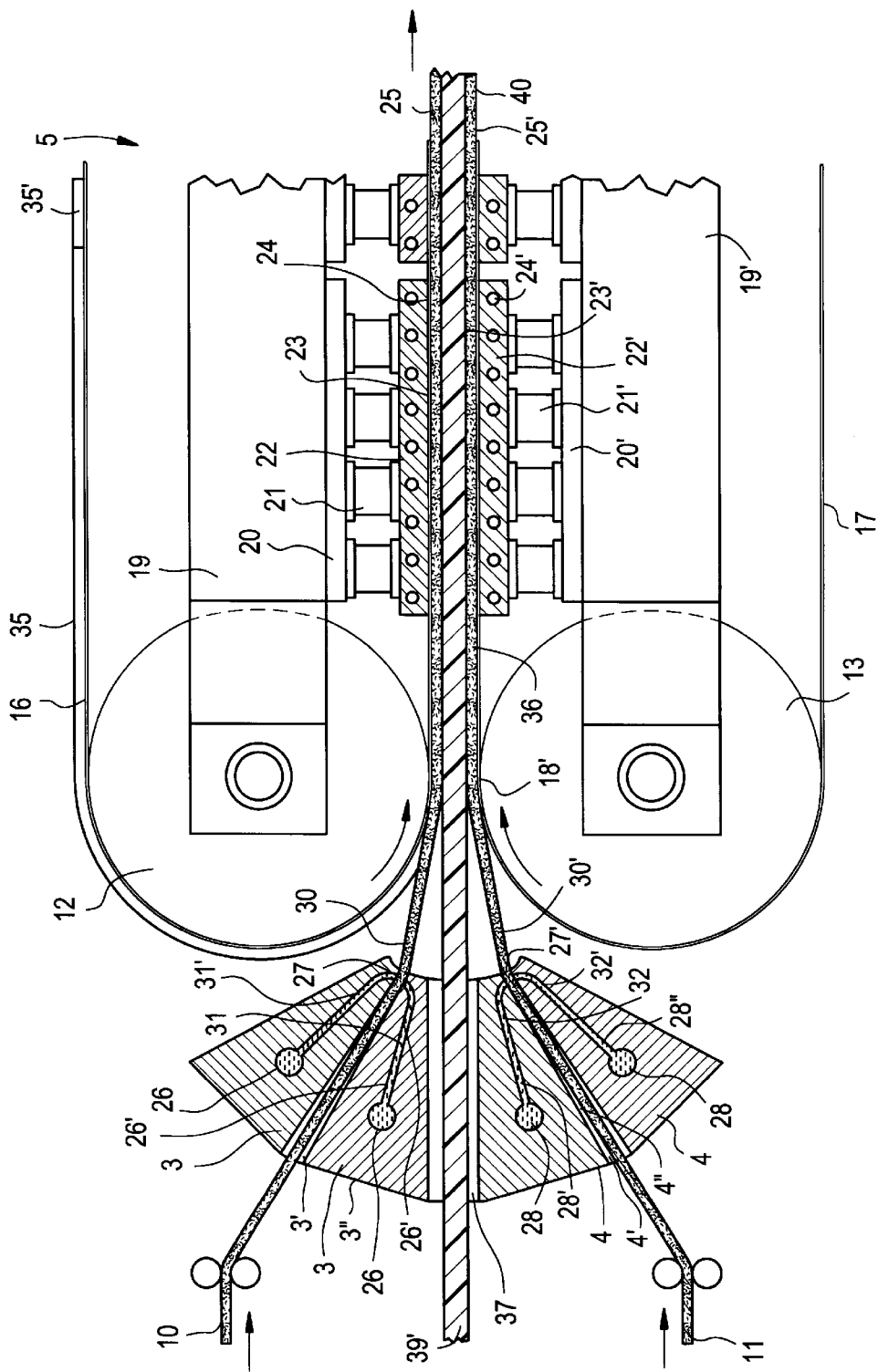
FIG. 4 shows the detail according to FIG. 1 concerning the impregnation nozzles (3, 4) and the entry rollers (12, 13) of the double band press.

The process for the manufacture of the composite panel of the invention is carried out as follows. The foam thermoplastic is produced for manufacturing the core layer (39) in such a manner that, for example, polypropylene in granulate form is mixed with a foaming agent (also provided in granulate form), and is heated in an extruder (not shown) to a melting temperature. The foaming agent disintegrates in this way into gaseous combinations which can penetrate into the polypropylene matrix, transforming into foam. This foamed thermoplastic (39') is applied onto the transport table (38) for further processing according to FIG. 2 and is then transported through the extruder nozzle aperture (37). For the formation of the outer layers (25, 25') of the composite panel (40) of the invention, a thermoplastic, for example, polypropylene which can be mixed with additives such as peroxide if needed, is guided into the extruders (1, 2). The thermoplastic is melted in the extruders (1, 2) which are heated to at least the melting temperature of the thermoplastic, and are guided in the form of thermoplastic melts (26) and (28) to the distribution units (8) and (9). The melt stream can be regulated in the distribution units (8) and (9) by means of a melt-control valve (29, 29'); the melt streams (26', 26") and (28', 28") are formed and are guided to the nozzle apertures (31, 31') and the impregnation nozzle (3) and (32) and (32') of the impregnation nozzle 4. The impregnation nozzles (3, 4) were heated at least to the melting temperature of the thermoplastic.

The fiberglass mats (10, 11) are guided from the supply rolls (33, 34) to the impregnation nozzles (3, 4). These fiberglass mats can be, for example, needled into tangled fiber mats with a surface content of 450 to 1300 g/m$^2$.

The guidance of these fiberglass mats (10, 11) is carried out in such a manner that they pass the preheated nozzle apertures (3', 4'). The nozzle apertures (3', 4') are arranged so that they run conically with respect to the nozzle aperture outlet (27, 27'). The nozzle aperture cross section is therefore wider at the nozzle aperture inlet (3", 4") than at the nozzle aperture outlet (27, 27'). The thermoplastic melt streams (26', 26") are supplied on the upper and lower side of the glass fiber mats (10, 11) at the nozzle aperture outlet (27, 27'), so that the pre-impregnation of the fiberglass mats is already carried out at the nozzle aperture outlet (27, 27'). An even absorption by the fiberglass mats is ensured by means of this measure, whereby the extent of the absorption is set by means of the distribution units (8, 9). In this way, the properties, for example, the surface properties of the fiberglass reinforced outer layers (25, 25'), are influenced considerably.

The fiberglass mats pre-impregnated on both sides are additionally guided together with the thermoplastics (39') into the gap (18) of the double band press (5).

They are comprised of the heated entry rollers (12, 13) and the exit rollers (14, 15), and an endless steel band (16, 17) is tensely wrapped around each of the roller pairs (12, 14) or (13, 15). The cross-section of gap (18) between the entry rollers is adjustable so that a pre-calibration of the pre-impregnated fiberglass mat (30, 30') is effected. Furthermore, the pre-impregnated fiberglass mats are applied on both sides of the foamed thermoplastic (39') by pressure of the rollers (12, 13) without application of an adhesive, so that a pre-compound (36) of the composite panel (40) is generated. The same is guided to the cooling plates (22, 22') through which the heat of the pre-compound (36) is carried away. The cooling plates are suitably arranged such that a cooling medium, for example water, flows through boreholes (24, 24') in the plates, with the direction of flow through plates (24) on one side being opposite the direction of flow through plates (24') on the other side. In this way, it becomes possible to eliminate the internal strains in each of the thermoplastic materials, which are normally generated when extruding. Furthermore, the cooling plates (22, 22') serve as compressive plates and are therefore provided with gliding foils (23, 23') on the side facing the endless steel belts (16, 17); they are attached to the frame of the double band press (5) by means of compression cylinders (21, 21') and are therefore pressed onto both sides of the pre-compound (36). To prevent the thermoplastic melt from escaping from within the compression zone, the guide belts (35, 35') have a thickness similar to that of the pre-compound (36) and carry the pre-compound (36) laterally in the double band press (5), on both sides of the pre-compound (36) without interruption.

By means of cooling plates (22, 22'), it is possible to carry away the heat of the thermoplastic materials, so that the process of the invention can be carried out in an inexpensive manner. Furthermore, the compression exerted by the cooling plates can be held to a minimum, for example to 1 bar, to achieve adequate compression into the composite panel (40). This is so because a sufficient pre-impregnation of the fiberglass mats (10, 11) is carried out at the nozzle aperture outlet (27, 27') of the impregnation nozzles (3, 4), so that the compression is not used for the impregnation, but for the formation of a pre-compound (36) of the finished composite panel (40). The cooled composite panel (40) is guided to an arrangement of circular blades (6) where their side edges are cut. The composite panel (40) is then cut by guillotine shears (7).

The composite panel shows, for example, a resistance to bending of 80 N/mm$^3$ and an E module of 2200.

The composite panel of the invention can be used for manufacturing components for the molded parts of motor vehicles. For this application it shows a better elasticity than the usually utilized composite panel based on plywood that has a resistance to bending of only 50N/mm$^2$. However, it is also mechanically stressable like the so-called composite panel based on plywood, since the same also has an E module of 2200, a criterium for evaluating the rigidity of a mechanically demanding component.

We claim:

1. A process for manufacturing a composite panel, comprising a foamed thermoplastic core layer, which is attached on both sides with fiberglass mat-reinforced thermoplastic outer layers without adhesive, said process comprising forming the outer layers by guiding two fiberglass mats simultaneously through nozzle apertures of impregnation nozzles, feeding two streams of thermoplastic melts to each of the impregnation nozzles in controlled manner by means of extruders, and applying one of the streams of thermoplastic melt to the upper side and the other stream of thermoplastic melt to the lower side of the glass mats at the outlet of each nozzle aperture to produce impregnated fiberglass mats; and forming the composite panel by forming a foamed thermoplastic core in a separate extruder unit having a nozzle aperture and introducing the foam thermoplastic core between the fiberglass mats through the extruder nozzle aperture, guiding the impregnated fiberglass mats together with the foamed thermoplastic core positioned between the mats, into a gap between rollers of a double band press wherein the impregnated fiberglass mats are calibrated and are attached to both sides of the foamed thermoplastic core without using an adhesive thereby forming a pre-compound and compressing the pre-compound by means of cooling plates to form the composite panel.

2. Process according to claim 1, further comprising preheating the fiberglass mats and the foamed thermoplastic in the nozzle apertures.

3. Process according to claim 1, wherein the thermoplastic melt streams are comprised of polypropylene.

4. Process according to claim 1, wherein the flows of thermoplastic melts are controlled by melt-control valves installed in a distributor unit.

5. Process according to claim 1, wherein each fiberglass mat is comprised of cut and tangled glass fibers with a surface content of 450 to 1,300 $g/m^2$.

6. Process according to claim 1, wherein the impregnated fiberglass mats are calibrated in a cross-sectional adjustable gap between entry rollers of the double band press.

7. Process according to claim 1, wherein the pre-compound is compressed in the pressure range up to 2 bars to form the composite panel.

8. Process according to claim 1, wherein the foamed thermoplastic core is transported through an extruder nozzle aperture and is comprised of polypropylene.

9. Process according to claim 1, wherein each fiberglass mat is comprised of cut, tangled and uncut glass fibers with a surface content of 450 to 1,300 $g/m^2$.

* * * * *